United States Patent

Morris

[15] 3,688,251
[45] Aug. 29, 1972

[54] GEOPHONE
[72] Inventor: Harold B. Morris, Houston, Tex.
[73] Assignee: Electronic Systems, Inc., Houston, Tex.
[22] Filed: April 26, 1971
[21] Appl. No.: 137,525

[52] U.S. Cl. .......................340/17, 310/8.3, 310/8.4
[51] Int. Cl. .................................................G01v 1/16
[58] Field of Search .............340/10, 17; 310/8.3, 8.4

[56] References Cited

UNITED STATES PATENTS 3,555,503   1/1971   Morris.........................340/17

*Primary Examiner*—Benjamin A. Borchelt
*Assistant Examiner*—R. Kinberg
*Attorney*—Richards, Harris & Hubbard

[57] ABSTRACT

A geophone which detects and records acceleration includes an airtight housing partially filled with an acoustic transmission fluid. A diaphragm within the housing forms a cavity from which the air is evacuated through a channel in the housing. After evacuation the channel is sealed to maintain reduced pressure in the cavity during operation of the geophone.

8 Claims, 4 Drawing Figures

Patented Aug. 29, 1972
3,688,251
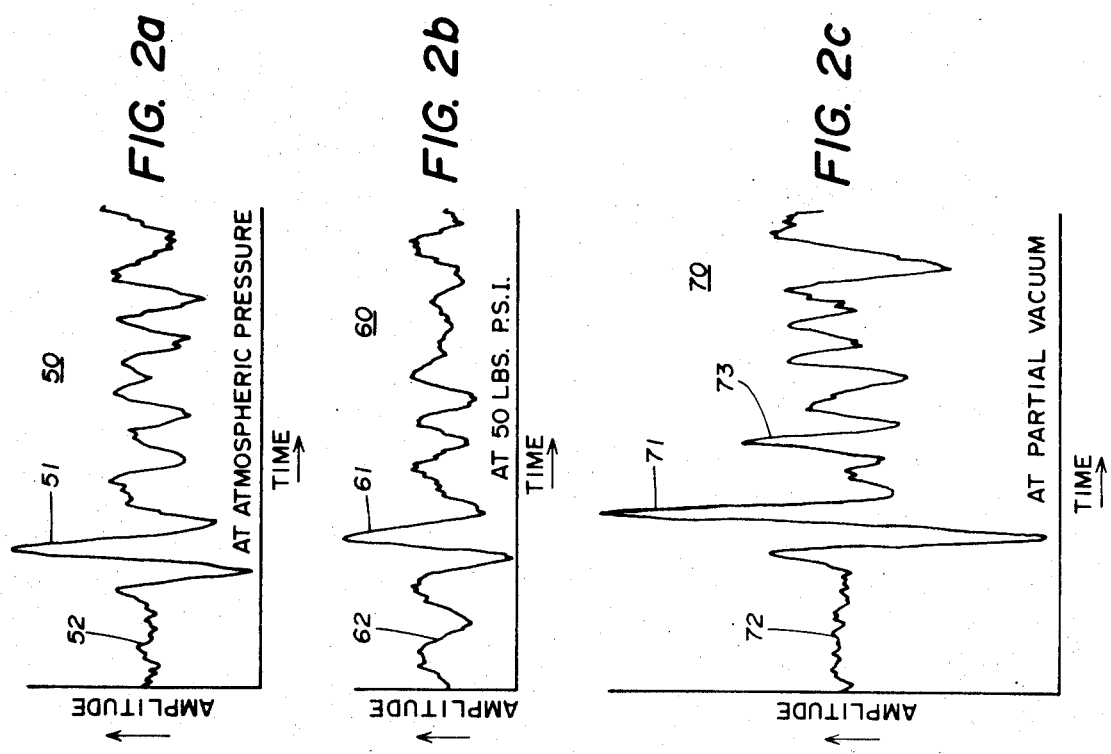
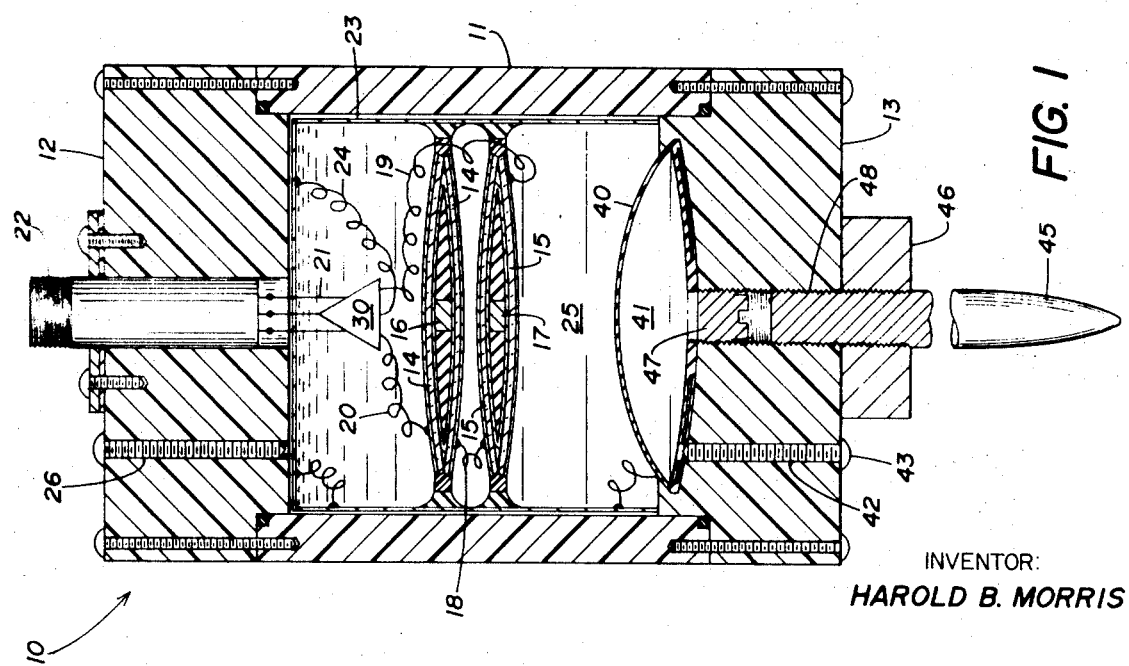
INVENTOR:
HAROLD B. MORRIS
Richard, Harris & Hubbard
ATTORNEYS

GEOPHONE

BACKGROUND OF THE INVENTION

In some seismic exploration systems, motion sensitive detectors are connected to the earth to detect its vibrations. Often pressure sensitive detectors, such as piezoelectric crystals, are placed in a chamber along with some type of mass. During earth vibrations, vertical acceleration of the geophone causes the mass to apply pressure to the detectors which generate a signal proportionate to the sensed motion.

Some systems of the prior art, such as described and claimed in U.S. Pat. No. 3,489,997, provide wide band input capabilities and filter out lower frequencies to increase resolution. In such systems, sensitivity is especially important to accurately characterize the reflecting boundaries. However, high frequency systems generally yield lower amplitudes which decrease the accuracy of detection.

SUMMARY OF THE INVENTION

The present invention is directed to a device which has been found to overcome the problems present in prior systems. An air-evacuated cavity within the housing of a geophone is provided to increase the sensitivity of its acceleration detectors.

More particularly, in accordance with the present invention, there is provided an airtight housing in which at least one acceleration sensitive pressure detector is mounted. The housing is partially filled with an acoustic transmission fluid. A resilient membrane forms a cavity separated from the fluid and partially evacuated of air. A passage in the housing communicates between the cavity and the atmosphere to facilitate evacuation.

BRIEF DESCRIPTION OF THE DRAWINGS

For a more complete understanding of the present invention and for further objects and advantages thereof, reference may now be had to the following description taken in conjunction with the accompanying drawings in which:

FIG. 1 is a sectional view of the seismometer employed in accordance with the present invention; and FIG. 2 is a series of three graphs showing the detector response when the geophone cavity is at atmospheric pressure, 50 pounds per square inch pressure, and evacuated of air.

DESCRIPTION OF THE PREFERRED EMBODIMENT

Referring now to FIG. 1, a housing 10 is formed by casing 11, top closure 12, and bottom closure 13. Two pairs of crystal discs 14 and 15 are mounted as detectors in housing 10. Each pair of discs 14 and 15 are bowed opposite of each other to increase crystal sensitivity. The crystals 14 and 15 are electrically connected together by metal shims 16 and 17 and by a wire 18. The electrical output of detectors 14 and 15 is conducted by leads 19 and 20 to amplifier 30. Leads 21 conduct the amplifier output through a plug 22 to suitable devices for storing or recording the signals.

The inner walls of housing 10 are lined with copper 23 to provide a shield as well as a ground terminal for amplifier 30 by way of conductor 24. The interior of housing 10 is filled with a silicon compound 25 which protects the unit against shock, acts as a hydraulic restraint, and provides a weight or mass against which the crystal pairs 14 and 15 may work.

For a more specific description of the above mentioned portions of the invention, reference is made to U.S. Pat. Nos. 3,489,997 and 3,555,503.

A diaphragm 40, preferably made of silicon rubber, is secured at the periphery thereof in a suitable cement to bottom closure 13. The diaphragm 40 forms a cavity 41 between fluid 25 and closure 13. Cavity 41 is air-evacuated to form a vacuum. Evacuation is effected through passage 42 in bottom closure 13. Passage 42 is sealed after evacuation with a suitable bolt 43. Typically a threaded 4-40 bolt might be used in a threaded passageway.

A threaded spike 45 is screwed into a threaded channel 48 of closure 13 and secured by a collar 46. A cover 47 permanently seals the top of threaded channel 48 to maintain an airtight cavity 41.

To assemble the invention, cavity 41 is first filled with water or air. The remainder of the housing is then filled with a compound 25, preferably G.E.'s Insul-grease G640 with some 1,000 centepoise silicon oil on top to aid degassing. Top closure 12 is left off the housing while air bubbles are removed from compound 25 in a vacuum chamber. Closure 12 is then fastened in place, and further evacuation takes place through a vent hole 26.

After plugging vent hole 26 to maintain the decreased pressure, the geophone is turned upside down, and all water, if water is used, is removed from cavity 41. The geophone is then placed in the vacuum chamber upside down and cavity 41 is evacuated of air. Passage 42 is then closed by bolt 43 to maintain the vacuum in cavity 41.

In operation spike 45, which may be an auger spike, is coupled to the earth. Seismic motion is sensed by the pressure of fluid 25 against crystal detector pairs 14 and 15. This motion is converted to electrical signals and amplified by amplifier 30. The absence of air in cavity 41 allows unopposed motion of the fluid 25 within the housing in response to seismic motion. The sensitivity of the geophone to seismic vibrations is thereby greatly increased over systems of the prior art.

Referring now to FIG. 2, three graphs are shown indicating the relative signal response of the geophone with cavity 41 at different air pressures. FIG. 2(a) shows a signal response 50 of the geophone when cavity 41 is at atmospheric pressure. Peak 51 represents the response to a metal rod sharply striking cement 30 feet away from the geophone. The random oscillation, such as that shown by peak 52, is believed to be air cavity resonance and is essentially undesirable noise which interferes with accurate detection.

FIG. 2(b) shows the geophone response 60 with cavity 41 under a pressure of 50 pounds per square inch. Peak 61 shows the response to the same type of seismic shock previously described for signal response 50. It can be seen that peak 61 is somewhat less in amplitude than that of peak 51 indicating a decrease in sensitivity. It may also be seen that the air cavity resonance 62 is substantially increased over resonance 52 when cavity 41 was at atmospheric pressure. Increasing the pressure in cavity 41 therefore results in decreased sensitivity of detectors 14 and 15 and an increase in undesirable noise level.

FIG. 2(c) indicates the response 70 of the geophone when cavity 41 is evacuated of air. It may readily be seen that peak 71, induced by the same type of seismic shock discussed previously, is substantially larger in amplitude than peaks 51 and 61. Furthermore, air cavity resonance 72 with a vacuum cavity is substantially decreased over resonance 52 and 62. It may easily be seen that the sensitivity of the geophone is greatly increased by making cavity 41 at least a partial vacuum. The noise level is substantially reduced, amplitude response is substantially increased and secondary vibrations, as shown by peak 73, are more readily detected.

Having described the invention in connection with certain specific embodiments thereof, it is to be understood that further modifications may now suggest themselves to those skilled in the art, and it is intended to cover such modifications as fall in the scope of the appended claims.

What is claimed is:

1. In a geophone, where acceleration sensitive pressure detectors are mounted in an airtight housing partially filled with an acoustic transmission fluid, a resilient membrane within said housing forming an enclosure unoccupied by said fluid, said enclosure being partially evacuated of air.

2. The combination set forth in claim 1 wherein said housing is provided with a passage for communicating between said enclosure and the atmosphere.

3. The combination defined in claim 2 further comprising a plug sealing said passage to maintain the pressure in said enclosure.

4. In a geophone, where acceleration sensitive pressure detectors are mounted in an airtight housing partially filled with an acoustic transmission fluid, the combination which comprises:
   a. a resilient membrane within said housing forming an enclosure unoccupied by said fluid, and
   b. structure for establishing and maintaining a pressure substantially below atmospheric pressure in said enclosure.

5. The combination defined in claim 4 wherein said resilient membrane is a rubber diaphragm connected along the periphery to the inner side of said housing.

6. In a geophone utilizing acceleration sensitive pressure detectors, the combination comprising:
   a. an airtight housing for mounting said detectors, said housing being partially filled with an acoustic transmission fluid and provided with a passage communicating between the inside of said housing and the atmosphere,
   b. a resilient membrance within said housing forming an enclosure unoccupied by said fluid, said enclosure communicating with said passage and being partially evacuated of air, and
   c. a plug for sealing said passage in said housing to maintain the pressure in said enclosure.

7. The combination defined in claim 6 wherein said plug is a threaded bolt.

8. The combination defined in claim 6 wherein said resilient membrane is a rubber diaphragm connected along the periphery to an inner side of said housing.

* * * * *